(12) United States Patent
Chiong

(10) Patent No.: US 10,106,654 B2
(45) Date of Patent: Oct. 23, 2018

(54) METHOD OF POLYARYLENE SULFIDE PRECIPITATION

(71) Applicant: Ticona LLC, Florence, KY (US)

(72) Inventor: Hendrich A. Chiong, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 230 days.

(21) Appl. No.: 15/045,313

(22) Filed: Feb. 17, 2016

(65) Prior Publication Data

US 2016/0244569 A1  Aug. 25, 2016

Related U.S. Application Data

(60) Provisional application No. 62/118,033, filed on Feb. 19, 2015.

(51) Int. Cl.
| C08G 75/02 | (2016.01) |
| C08G 75/14 | (2006.01) |
| C08G 75/0204 | (2016.01) |
| C08G 75/025 | (2016.01) |
| C08G 75/0281 | (2016.01) |

(52) U.S. Cl.
CPC ......... C08G 75/14 (2013.01); C08G 75/0204 (2013.01); C08G 75/025 (2013.01); C08G 75/0281 (2013.01)

(58) Field of Classification Search
CPC ...... C08G 75/14; C08G 75/16; C08J 2381/04; C08L 81/02
USPC ........................................................ 524/609
See application file for complete search history.

(56) References Cited

U.S. PATENT DOCUMENTS

| 3,407,182 A | 10/1968 | Hinton |
| 3,869,433 A | 3/1975 | Campbell |
| 3,919,177 A | 11/1975 | Campbell |
| 4,038,259 A | 7/1977 | Campbell et al. |
| 4,038,260 A | 7/1977 | Campbell |
| 4,038,262 A | 7/1977 | Edmonds, Jr. |
| 4,038,263 A | 7/1977 | Edmonds, Jr. et al. |
| 4,039,518 A | 8/1977 | Campbell |

(Continued)

FOREIGN PATENT DOCUMENTS

| EP | 1 837 359 | 9/2007 |
| JP | S5829822 | 2/1983 |

(Continued)

OTHER PUBLICATIONS

Machine translation of JP2014028917.

(Continued)

*Primary Examiner* — Jane L Stanley
(74) *Attorney, Agent, or Firm* — Dority & Manning, P.A.

(57) ABSTRACT

A method for forming a polyarylene sulfide is described. The method can include a multi-step cooling and precipitation process in which the cooling rate of the solution that carries the polymer is decreased during a portion of the overall cooling. This slower cooling period can encompass at least a portion of the period during which the polymer precipitates from the solution. The precipitation process can form polyarylene sulfide particles with good particle integrity and a narrow particle size distribution, which can reduce fines and improve downstream processing and final product characteristics.

38 Claims, 3 Drawing Sheets

(56) References Cited

U.S. PATENT DOCUMENTS

| | | |
|---|---|---|
| 4,056,515 A | 11/1977 | Vidaurri, Jr. |
| 4,060,520 A | 11/1977 | Irvin |
| 4,064,114 A | 12/1977 | Edmonds, Jr. |
| 4,089,847 A | 5/1978 | Edmonds, Jr. et al. |
| 4,096,132 A | 6/1978 | Edmonds, Jr. |
| 4,368,321 A | 1/1983 | Sherk et al. |
| 4,370,470 A | 1/1983 | Vidaurri et al. |
| 4,393,197 A | 7/1983 | Edmonds, Jr. |
| 4,415,729 A | 11/1983 | Scoggins et al. |
| 4,451,640 A | 5/1984 | Shiiki et al. |
| 4,495,332 A | 1/1985 | Shiiki et al. |
| 4,500,706 A | 2/1985 | Mathis et al. |
| 4,501,902 A | 2/1985 | Cleary |
| 4,514,558 A | 4/1985 | Shiiki et al. |
| 4,535,117 A | 8/1985 | Mathis et al. |
| 4,537,953 A | 8/1985 | Kawakami et al. |
| 4,613,654 A | 9/1986 | Katto et al. |
| 4,645,826 A | 2/1987 | Iizuka et al. |
| 4,699,975 A | 10/1987 | Katto et al. |
| 4,734,484 A | 3/1988 | Alfes et al. |
| 4,740,569 A | 4/1988 | Tieszen et al. |
| 4,745,167 A | 5/1988 | Iizuka et al. |
| 4,748,231 A | 5/1988 | Nesheiwat |
| 4,767,841 A | 8/1988 | Goetz et al. |
| 4,769,442 A | 9/1988 | Iwasaki et al. |
| 4,786,711 A | 11/1988 | Senatore et al. |
| 4,794,164 A | 12/1988 | Iwasaki et al. |
| 4,795,671 A | 1/1989 | Shiiki et al. |
| 4,812,539 A | 3/1989 | Iizuka et al. |
| 4,814,430 A | 3/1989 | Iwasaki et al. |
| 4,820,800 A | 4/1989 | Geibel et al. |
| 4,820,801 A | 4/1989 | Inoue et al. |
| 4,841,019 A | 6/1989 | Iwasaki et al. |
| 4,931,516 A | 6/1990 | Iizuka et al. |
| 4,960,861 A | 10/1990 | Kotera et al. |
| 4,976,825 A | 12/1990 | Iwasaki et al. |
| 5,008,368 A | 4/1991 | Nesheiwat |
| 5,015,725 A | 5/1991 | Scoggins et al. |
| 5,023,315 A | 6/1991 | Ceurvorst et al. |
| 5,037,954 A | 8/1991 | Nesheiwat et al. |
| 5,053,486 A | 10/1991 | Nesheiwat |
| 5,071,944 A | 12/1991 | Cliffton et al. |
| 5,077,374 A | 12/1991 | Cleary |
| 5,086,163 A | 2/1992 | Scoggins et al. |
| 5,089,596 A | 2/1992 | Clifton et al. |
| 5,089,597 A | 2/1992 | Nesheiwat et al. |
| 5,093,468 A | 3/1992 | Kohler |
| 5,110,902 A | 5/1992 | Scoggins et al. |
| 5,126,430 A | 6/1992 | Senga et al. |
| 5,128,445 A | 7/1992 | Scoggins et al. |
| 5,134,224 A | 7/1992 | Nesheiwat et al. |
| 5,145,946 A | 9/1992 | Fujii et al. |
| 5,155,207 A | 10/1992 | Senatore et al. |
| 5,179,194 A | 1/1993 | Kawakami et al. |
| 5,194,580 A | 3/1993 | Koyama et al. |
| 5,235,032 A | 8/1993 | Geibel et al. |
| 5,241,043 A | 8/1993 | Senga |
| 5,266,680 A | 11/1993 | Reed |
| 5,278,283 A | 1/1994 | Miyoshi et al. |
| 5,280,104 A | 1/1994 | Geibel et al. |
| 5,296,579 A | 3/1994 | Geibel et al. |
| 5,314,972 A | 5/1994 | Nesheiwat et al. |
| 5,328,980 A | 7/1994 | Decker et al. |
| 5,334,701 A | 8/1994 | Ash et al. |
| 5,342,920 A | 8/1994 | Imai et al. |
| 5,350,833 A | 9/1994 | Inoue et al. |
| 5,352,768 A | 10/1994 | Stuber et al. |
| 5,354,841 A | 10/1994 | Geibel et al. |
| 5,364,928 A | 11/1994 | Ash |
| 5,438,115 A | 8/1995 | Fahey et al. |
| 5,440,009 A | 8/1995 | Ash et al. |
| 5,475,081 A | 12/1995 | Imai et al. |
| 5,618,981 A | 4/1997 | Shaw |
| 5,635,587 A | 6/1997 | Koyama et al. |
| 5,688,908 A | 11/1997 | Haubs et al. |
| 5,696,282 A | 12/1997 | Shaw et al. |
| 5,744,576 A | 4/1998 | Miyahara et al. |
| 5,756,654 A | 5/1998 | Sase et al. |
| 5,777,069 A | 7/1998 | Tsuda et al. |
| 5,780,583 A | 7/1998 | Lubowitz et al. |
| 5,789,533 A | 8/1998 | Yamanaka et al. |
| 5,804,076 A | 9/1998 | Yamasaki et al. |
| 5,840,830 A | 11/1998 | Miyahara et al. |
| 5,856,433 A | 1/1999 | Koyama et al. |
| 5,894,072 A | 4/1999 | Haubs et al. |
| 5,898,061 A | 4/1999 | Sase et al. |
| 5,905,137 A | 5/1999 | Haubs et al. |
| 5,929,203 A | 7/1999 | Ash et al. |
| 6,201,097 B1 | 3/2001 | Geibel et al. |
| 6,201,098 B1 | 3/2001 | Haubs et al. |
| 6,242,501 B1 | 6/2001 | Green et al. |
| 6,281,326 B1 | 8/2001 | Ash et al. |
| 6,331,608 B1 | 12/2001 | Vidaurri et al. |
| 6,337,062 B1 | 1/2002 | Akiba |
| 6,350,852 B1 | 2/2002 | Haubs et al. |
| 6,388,003 B1 | 5/2002 | Okamoto et al. |
| 6,538,102 B1 | 3/2003 | Haubs et al. |
| 6,562,900 B2 | 5/2003 | Okamoto et al. |
| 6,566,488 B2 | 5/2003 | Okamoto et al. |
| 6,600,009 B2 | 7/2003 | Inoue et al. |
| 6,646,105 B2 | 11/2003 | Shirota |
| 6,734,282 B1 | 5/2004 | Wagener et al. |
| 6,743,890 B2 | 6/2004 | Bando |
| 6,750,319 B2 | 6/2004 | Koyama |
| 6,818,132 B2 | 11/2004 | Haubs et al. |
| 6,939,942 B2 | 9/2005 | Shirota |
| 6,982,312 B2 | 1/2006 | Senga et al. |
| 7,018,574 B2 | 3/2006 | Koyama |
| 7,026,439 B2 | 4/2006 | Senga et al. |
| 7,094,867 B2 | 8/2006 | Miyahara et al. |
| 7,115,704 B2 | 10/2006 | Horiuchi et al. |
| 7,220,817 B2 | 5/2007 | Matsuzaki et al. |
| 7,312,300 B2 | 12/2007 | Mitchell |
| 7,317,072 B2 | 1/2008 | Senga et al. |
| 7,432,339 B2 | 10/2008 | Mitchell |
| 7,501,111 B2 | 3/2009 | Keller et al. |
| 7,504,476 B2 | 3/2009 | Kawama et al. |
| 7,517,946 B2 | 4/2009 | Sato et al. |
| 7,569,656 B2 | 8/2009 | Kagoshima et al. |
| 7,632,915 B2 | 12/2009 | Sato et al. |
| 7,655,748 B2 | 2/2010 | Sato et al. |
| 7,750,111 B2 | 7/2010 | Horiuchi et al. |
| 7,754,795 B2 | 7/2010 | Hintzer et al. |
| 7,754,848 B2 | 7/2010 | Sato et al. |
| 7,767,783 B2 | 8/2010 | Kawama et al. |
| 7,834,133 B2 | 11/2010 | Suzuki et al. |
| 8,076,423 B2 | 12/2011 | Ishio et al. |
| 8,076,447 B2 | 12/2011 | Sato et al. |
| 8,138,302 B2 | 3/2012 | Sato et al. |
| 8,183,336 B2 | 5/2012 | Sato et al. |
| 8,211,997 B2 | 7/2012 | Matsuzaki et al. |
| 8,263,734 B2 | 9/2012 | Fodor et al. |
| 8,329,832 B2 | 12/2012 | Horiuchi et al. |
| 8,426,552 B2 | 4/2013 | Hinokimori et al. |
| 8,440,784 B2 | 5/2013 | Kaiho et al. |
| 8,445,629 B2 | 5/2013 | Hinokimori et al. |
| 8,530,605 B2 | 9/2013 | Konno et al. |
| 8,546,518 B2 | 10/2013 | Unohara et al. |
| 8,609,790 B2 | 12/2013 | Suzuki et al. |
| 8,680,230 B2 | 3/2014 | Konno et al. |
| 8,883,959 B2 | 11/2014 | Hinokimori |
| 8,921,513 B2 | 12/2014 | Luo et al. |
| 8,981,041 B2 | 3/2015 | Kimura et al. |
| 9,068,047 B2 | 6/2015 | Ichinose et al. |
| 9,074,048 B2 | 7/2015 | Kim et al. |
| 9,096,723 B2 | 8/2015 | Ichinose et al. |
| 9,187,641 B2 | 11/2015 | Ouchiyama et al. |
| 9,255,350 B2 | 2/2016 | Taniguchi et al. |
| 9,339,778 B2 | 5/2016 | Koizumi et al. |
| 9,388,283 B2 | 7/2016 | Chiong et al. |
| 9,403,948 B2 | 8/2016 | Chiong et al. |
| 2004/0164443 A1 | 8/2004 | Koyanna |
| 2005/0171332 A1 | 8/2005 | Koyama |

(56) References Cited

U.S. PATENT DOCUMENTS

| | | | |
|---|---|---|---|
| 2005/0215759 A1* | 9/2005 | Matsuzaki | C08G 75/0254 528/373 |
| 2010/0163499 A1 | 7/2010 | Odueyungbo | |
| 2011/0319587 A1 | 12/2011 | Hinokimori | |
| 2013/0068256 A1 | 3/2013 | Kobayashi et al. | |
| 2013/0253147 A1* | 9/2013 | Ichinose | C08G 75/02 525/537 |
| 2013/0317159 A1 | 11/2013 | Geibel et al. | |
| 2015/0065664 A1 | 3/2015 | Konno et al. | |
| 2015/0087776 A1 | 3/2015 | Chiong et al. | |
| 2015/0087777 A1 | 3/2015 | Chiong et al. | |
| 2015/0087778 A1 | 3/2015 | Chiong et al. | |
| 2015/0087780 A1* | 3/2015 | Chiong | C08G 75/16 524/609 |
| 2015/0087805 A1 | 3/2015 | Nekkanti et al. | |
| 2015/0175748 A1 | 6/2015 | Fodor et al. | |
| 2016/0244568 A1 | 8/2016 | Chiong | |

FOREIGN PATENT DOCUMENTS

| | | |
|---|---|---|
| JP | S5847026 | 3/1983 |
| JP | S58125721 | 7/1983 |
| JP | S59168032 | 9/1984 |
| JP | S6055029 | 3/1985 |
| JP | S60235838 | 11/1985 |
| JP | S61228023 | 10/1986 |
| JP | S62285922 | 12/1987 |
| JP | H0280432 | 3/1990 |
| JP | H02160834 | 6/1990 |
| JP | H02302436 | 12/1990 |
| JP | H05271414 | 10/1993 |
| JP | H06145355 | 5/1994 |
| JP | H0649762 | 6/1994 |
| JP | H07118389 | 5/1995 |
| JP | H07228699 | 8/1995 |
| JP | H07242746 | 9/1995 |
| JP | H07292107 | 11/1995 |
| JP | H07330911 | 12/1995 |
| JP | H0841201 | 2/1996 |
| JP | H08100064 | 4/1996 |
| JP | H08134216 | 5/1996 |
| JP | H08151443 | 6/1996 |
| JP | H08157600 | 6/1996 |
| JP | H08157718 | 6/1996 |
| JP | H08170016 | 7/1996 |
| JP | H08170017 | 7/1996 |
| JP | H08176302 | 7/1996 |
| JP | H08193130 | 7/1996 |
| JP | H08193131 | 7/1996 |
| JP | H08198965 | 8/1996 |
| JP | H08198966 | 8/1996 |
| JP | H08198967 | 8/1996 |
| JP | H08231722 | 9/1996 |
| JP | H08231723 | 9/1996 |
| JP | H08239474 | 9/1996 |
| JP | 2543673 | 10/1996 |
| JP | H08253587 | 10/1996 |
| JP | H08269199 | 10/1996 |
| JP | H08269200 | 10/1996 |
| JP | H08283413 | 10/1996 |
| JP | H08319348 | 12/1996 |
| JP | H09104816 | 4/1997 |
| JP | H09124940 | 5/1997 |
| JP | H09194726 | 7/1997 |
| JP | H09296042 | 11/1997 |
| JP | H107798 | 1/1998 |
| JP | H1045911 | 2/1998 |
| JP | H1045912 | 2/1998 |
| JP | H1060113 | 3/1998 |
| JP | H10110034 | 4/1998 |
| JP | H10158399 | 6/1998 |
| JP | H10195197 | 7/1998 |
| JP | H10245434 | 9/1998 |
| JP | H1180355 | 3/1999 |
| JP | H11169870 | 6/1999 |
| JP | H11349566 | 12/1999 |
| JP | 2000136246 | 5/2000 |
| JP | 2000191785 | 7/2000 |
| JP | 2000239383 | 9/2000 |
| JP | 2001040090 | 2/2001 |
| JP | 2001172387 | 6/2001 |
| JP | 2001181394 | 7/2001 |
| JP | 2002187949 | 7/2002 |
| JP | 2002201274 | 7/2002 |
| JP | 2002201275 | 7/2002 |
| JP | 2002212292 | 7/2002 |
| JP | 2003026803 | 1/2003 |
| JP | 2003275773 | 9/2003 |
| JP | 2004107567 | 4/2004 |
| JP | 2004182753 | 7/2004 |
| JP | 2004352923 | 12/2004 |
| JP | 2005041922 | 2/2005 |
| JP | 2005047953 | 2/2005 |
| JP | 2005264030 | 9/2005 |
| JP | 2005344045 | 12/2005 |
| JP | 2006016567 | 1/2006 |
| JP | 2007077209 | 3/2007 |
| JP | 2007314803 | 12/2007 |
| JP | 2008075055 | 4/2008 |
| JP | 2008239767 | 10/2008 |
| JP | 2008248153 | 10/2008 |
| JP | 2008248154 | 10/2008 |
| JP | 4256506 | 4/2009 |
| JP | 2009185143 | 8/2009 |
| JP | 2010037518 | 2/2010 |
| JP | 2010126621 | 6/2010 |
| JP | 4994997 | 8/2012 |
| JP | 2013023586 | 2/2013 |

OTHER PUBLICATIONS

International Search Report and Written Opinion for PCT/US16/17083, dated Apr. 21, 2016, 13 pages.

Related U.S. Patent Applications Form.

Fahey et al., Poly(p-phenylene sulfide) Synthesis: A Step-Growth Polymerization with Unequal Step Reactivity, *Macromolecules* 1997, pp. 387-393, 7 pages.

Venkata M. Nekkanti et al., U.S. Appl. No. 15/045,296, filed Feb. 17, 2016, Method for Forming a Low Viscosity Polyarylene Sulfide.

Hendrich A. Chiong, U.S. Appl. No. 14/045,301, filed Feb. 17, 2016, Method for Forming a High Molecular Weight Polyarylene Sulfide.

Hendrich A. Chiong, U.S. Appl. No. 15/045,321, filed Feb. 17, 2016, Technique for Forming a High Melt Viscosity Polyarylene Sulfide.

\* cited by examiner

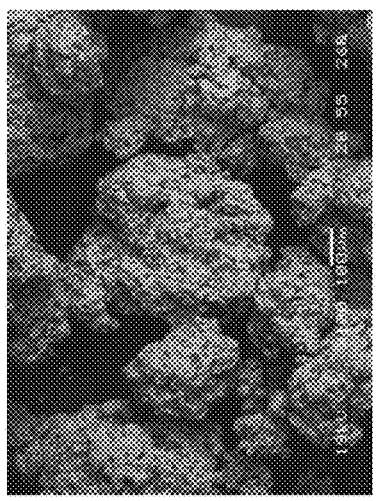
FIG. 3A
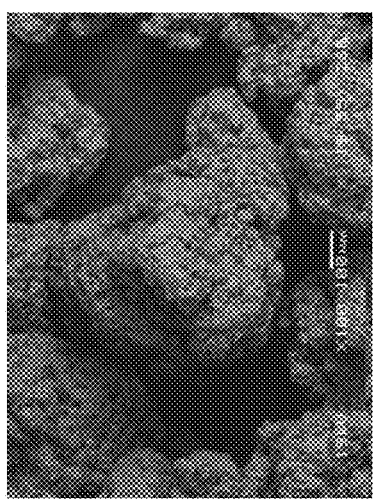
FIG. 3B
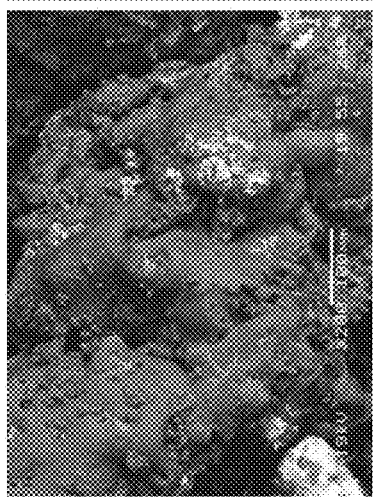
FIG. 3C
FIG. 3
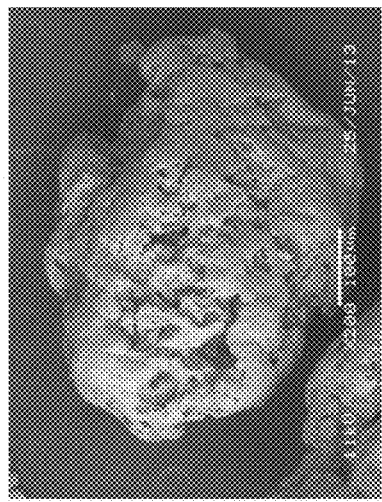
FIG. 4A
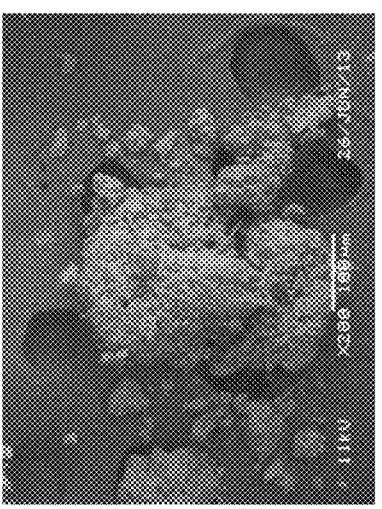
FIG. 4B
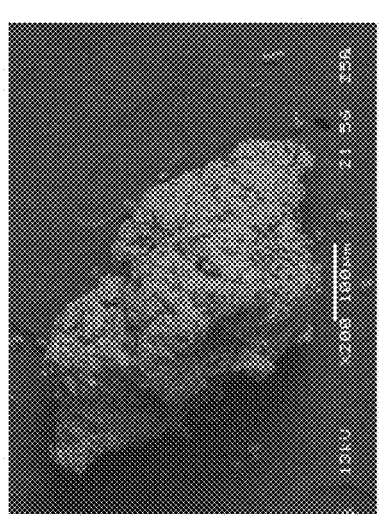
FIG. 4C
FIG. 4

METHOD OF POLYARYLENE SULFIDE PRECIPITATION

RELATED APPLICATIONS

The present application claims priority to U.S. Provisional Application Ser. No. 62/118,033, filed on Feb. 19, 2015, which is incorporated herein in its entirety by reference thereto.

BACKGROUND OF THE INVENTION

Polyarylene sulfides are high-performance polymers that may withstand high thermal, chemical, and mechanical stresses and are beneficially utilized in a wide variety of applications. Polyarylene sulfides are generally formed via polymerization of a dihaloaromatic monomer with an alkali metal sulfide or an alkali metal hydrosulfide in an organic amide solvent. Precipitation of the polyarylene sulfide from solution will occur when the polymer reaches a particular degree of polymerization, which can vary depending upon solution conditions including temperature, pressure, solvent concentration, polymer concentration, etc.

The precipitation conditions can affect the physical, chemical, optical, and other properties of the product polymer, and variation in product properties can in turn affect critical measures of market success such as customer satisfaction and production costs. By way of example, if the precipitated polymer has a poor particle integrity (due to, e.g., low density and/or excessively high porosity), the particles will be more likely to develop fines, which can lead to low yield and increased production costs as well as explosion hazards. On the other hand, if the polymer flakes have a porosity that is too low, washing of the polymer can be less effective, and the impurity content of the product can be unacceptably high. Similarly, consistent bulk density and narrow particle size distribution of the precipitated polymer particles can improve flow of the polymer flakes during, e.g., packaging, hopper loading, etc. Unfortunately, even minor variations in the precipitation conditions can lead to large differences in the properties of the precipitated flake.

Methods have been developed to better control precipitation of polyarylene sulfides, and thus improve the desired qualities of the polymers and compositions incorporating the polymers. For instance, the use of temperature controlled jacketing around a reactor to provide a controlled, slow cooling process has proven useful in controlling characteristics of the precipitating polymer.

While such cooling processes have been developed and improved upon to better control the characteristics of precipitated polyarylene sulfides, room for further improvement exists. What are needed in the art are precipitation methods for use during polyarylene sulfide formation that can provide reliable and desirable product characteristics.

SUMMARY

According to one embodiment, disclosed is a method for forming a polyarylene sulfide. For instance, a method can include a first polymerization reaction during which a sulfur-containing monomer and a dihaloaromatic monomer are reacted in an organic amide solvent to form a polyarylene sulfide prepolymer. The method also includes a second polymerization reaction during which the molecular weight of the prepolymer is increased. Specifically, the prepolymer can be reacted with a second dihaloaromatic monomer and a second sulfur-containing monomer to form the polyarylene sulfide. The method can also include a multi-step cooling process following the second polymerization reaction.

The multi-step cooling process can include a first cooling step during which a precipitation solution including the polyarylene sulfide, water, and an organic amide solvent is cooled at a first cooling rate to a first temperature. For example, the first cooling rate can be about 1° C. per minute (° C./min) or greater and the first temperature can be from about 235° C. to about 245° C. Following, the solution is further cooled at a second cooling rate that is slower than the first cooling rate to a second temperature. For example, the second cooling rate can be about 1° C./min or less and the second temperature can be from about 220° C. to about 230° C. Following the second cooling step, the solution can be cooled at a third cooling rate that is faster than the second cooling rate, for example at a rate of about 1° C./min or greater.

Over the course of the multi-step cooling process, the polyarylene sulfide of the solution can precipitate to form polyarylene sulfide particles.

Also disclosed is polyarylene sulfide particles that can be precipitated according to the methods and that can have desirable qualities. For instance, the precipitated particles can have a bulk density of from about 0.2 grams per cubic centimeter (g/cc) to about 1 g/cc and can have pore area of from about 35 square meters per gram ($mm^2/g$) to about 74 $m^2/g$. Thus the particles can exhibit good particle integrity, with little fines formation, and can also be porous, which can improve washing and purification processes and provide a polymer with low impurity levels.

BRIEF DESCRIPTION OF THE FIGURES

The present disclosure may be better understood with reference to the following figures:

FIG. 3 illustrates three images (FIG. 3A, FIG. 3B, FIG. 3C) of decreasing magnification of polyarylene sulfide particles formed according to disclosed methods.

FIG. 4 illustrates three polyarylene sulfide particles including a particle formed according to a disclosed method (FIG. 4A) a particle formed according to a different precipitation process (FIG. 4B) and a commercially available particle (FIG. 4C).

DETAILED DESCRIPTION

Figure 1:
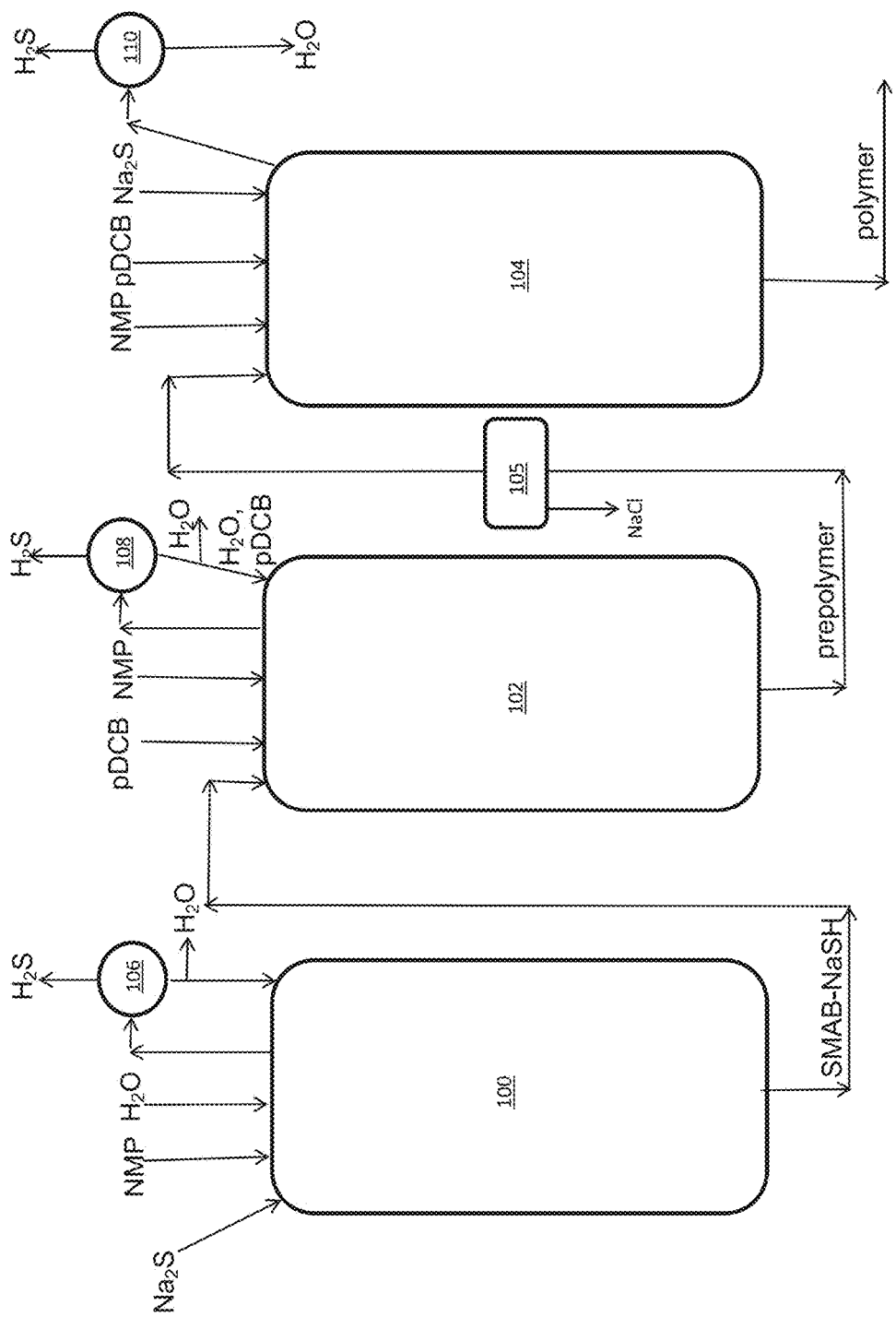
FIG. 1 is a flow diagram for one embodiment of a polyarylene sulfide formation process as described herein.

It is to be understood by one of ordinary skill in the art that the present discussion is a description of exemplary embodiments only, and is not intended as limiting the broader aspects of the present invention.

The present disclosure is generally directed to methods of forming a polyarylene sulfide. More specifically, the disclosed methods include forming a polyarylene sulfide in solution and then precipitating the polyarylene sulfide according to a controlled precipitation process. Through control of the precipitation process, the product polymer particles can exhibit desirable physical characteristics, which can improve not only downstream processing but also provide excellent polymer characteristics for end use applications. For instance, the precipitated polymer particles can have a narrow particle size distribution with few fines formed during precipitation and can also have good particle integrity with little formation of fines during downstream processing. Fines can not only lead to product loss, but can also cause production difficulties through flow issues (e.g., plugging) as well as explosion hazard. The precipitated particles can also have a relatively high porosity, which can improve washing efficiency and impurity removal in downstream processing.

A method for precipitating the polyarylene sulfide can include a multi-step cooling process in which the cooling rate of the solution that carries the polymer is decreased during a portion of the overall cooling. This slower cooling period can encompass at least a portion of the period during which the polymer precipitates from the solution. The multi-step cooling process can improve multiple aspects of the precipitated polymer particles including the particle size distribution and the particle integrity. In addition, the multi-step cooling process can cool and precipitate the polymer faster than previously known methods in which solution cooling is maintained at a single rate throughout the precipitation and cooling process.

Other aspects of the precipitation process can also be controlled to beneficially affect the characteristics of the formed particles. For instance, the make-up of the precipitation solution, e.g., the relative amounts of water, solvent, polymer, etc., as well as the presence of other components in the solution can affect the particle characteristics. The pH of the solution can also affect the particle characteristics as can the mechanical energy imparted to the solution (e.g., via stirring) over the course of the precipitation process. In some cases, the polymerization solution (i.e., the solution within which the polyarylene sulfide is polymerized to the final molecular weight) can have the desired characteristics for the precipitation process that follows the polymerization process. In this case, the polymerization solution and the precipitation solution can be the same solution. In other cases, the polymerization solution can be altered following the polyarylene sulfide formation through addition or removal of components to form the precipitation solution from which the polyarylene sulfide is precipitated.

FIG. 1 illustrates one embodiment of a formation process that includes a polyarylene sulfide precipitation process. In general, the polyarylene sulfide can be a polyarylene thioether containing repeat units of the formula (I):

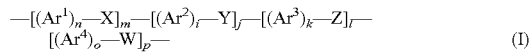

$$—[(Ar^1)_n—X]_m—[(Ar^2)_i—Y]_j—[(Ar^3)_k—Z]_l—[(Ar^4)_o—W]_p—$$ (I)

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide can typically include more than about 30 mol %, more than about 50 mol %, or more than about 70 mol % arylene sulfide (-AR—S—) units. In one embodiment the polyarylene sulfide includes at least 85 mol % sulfide linkages attached directly to two aromatic rings. In one embodiment, the polyarylene sulfide formed by the process can be a polyphenylene sulfide, defined herein as containing the polyphenylene sulfide structure —$(C_6H_4—S)_n$— (wherein n is an integer of 1 or more) as a component thereof.

In the embodiment of FIG. 1, the precipitation process is carried out in a reactor 106 that is separate from a reactor 104, in which the polyarylene sulfide is polymerized to a final molecular weight. This is not a requirement, however, and the precipitation process can alternatively be carried out within the reactor 104 or within a series of reactors. For instance, in those embodiments in which the polymerization solution meets the desired conditions for the precipitation, it may be preferred to precipitate the polymer within the reactor 104. In other embodiments, for instance in an embodiment in which one or more components are added to or removed from the polymerization solution to form the precipitation solution prior to the precipitation step, it may be preferred to carry out the precipitation step in a separate reactor 106.

Moreover, while the multi-step cooling process utilized in the precipitation process can be faster than single step precipitation processes utilized previously, it will still take time. Separation of different stages of the formation process can provide a route to increased throughput of a process. For instance, during the time period that a first amount of polyarylene sulfide is being precipitated from a precipitation solution in the reactor 106, another amount of polyarylene sulfide can be polymerized to the final molecular weight in the polymerization solution within reactor 104. This separation of stages can increase throughput.

The multi-step cooling process can include a first cooling period during which the precipitation solution is cooled relatively rapidly, a second cooling period during which the precipitation solution is cooled more slowly as compared to the first cooling period, and a third cooling period during which the precipitation solution is again cooled relatively rapidly. Over the course of the cooling process, the polyarylene sulfide can precipitate to form the polymer particles.

The first cooling period can cool the precipitation solution to a temperature at or near that at which precipitation of the polyarylene sulfide can begin. For example, the first cooling period can cool the precipitation solution to a temperature of from about 235° C. to about 245° C. The starting temperature for this cooling period can vary, for instance depending upon whether the precipitation process is carried out in the polymerization reactor or in a downstream reactor. In one embodiment, for example, the starting temperature for this cooling period can be greater than about 250° C., for instance from about 250° C. to about 280° C.

The cooling rate during the first cooling period can be relatively rapid, for instance about 1° C./min or greater. For instance, the cooling rate during the first cooling period can be from about 1.5° C./min to about 2.5° C./min or about 2° C./min in some embodiments. The amount of time for the first cooling period can vary from about 5 minutes to about 30 minutes in some embodiments, though the time can be greater or shorter and will depend upon the specific conditions of the operation.

Following the first cooling period, the precipitation solution can be further cooled at a cooling rate that is less than the previous cooling rate, generally about 1° C./min or less, for instance from about 0.3° C./min to about 0.7° C./min, or about 0.5° C./min in one embodiment. During this cooling period, the precipitation solution can be cooled to a temperature of from about 215° C. to about 235° C., or from about 220° C. to about 230° C. in some embodiments. The period of time for this cooling period can generally vary from about 30 minutes to about 100 minutes, depending upon the specific conditions of the operation.

Another faster cooling period can follow this slower cooling period. For instance, following the slower cooling period, the solution can be cooled further at a cooling rate of about 1° C./min or greater, for instance from about 1.5° C./min to about 2.5° C./min, or about 2° C./min in some embodiments.

While this faster cooling period that follows the slower cooling period can be at the same rate as the initial faster cooling period, this is not a requirement of the process, and the two faster cooling periods on either side of the slower cooling period can cool the precipitation solution at different rates.

The temperature to which this second faster cooling period cools the solution can vary, depending on further downstream processing of the solution. For instance, in one embodiment, the precipitation solution can be cooled to ambient, e.g., about 25° C. In some embodiments, however, it may be preferred to maintain the precipitation solution at an elevated temperature for downstream washing and purification of the polyarylene sulfide. For instance, the temperature of the precipitation solution following this cooling step can be from about 150° C. to about 200° C., or from about 170° C. to about 190° C., such as about 180° C. in some embodiments.

The precipitation solution can include an organic solvent and water in addition to the polyarylene sulfide. The relative amounts of the components of the precipitation solution can also affect the characteristics of the precipitated particles that include the polyarylene sulfide. For example, in one embodiment, the precipitation solution can include water in a relatively low amount, which can beneficially affect the particle integrity of the particles and decrease the likelihood of fines formation. For instance, the molar ratio of water to sulfur in the precipitation solution (i.e., total sulfur present in the precipitation solution including sulfur containing in polymer, salts, by-products, oligomers, etc.) prior to the first cooling step (i.e., prior to any precipitation of the polymer from the solution) can be about 5 or less, about 4 or less, or about 3 or less. For instance, the water to sulfur molar ratio in the precipitation solution prior to the first cooling step can be from about 2 to about 3.

In one embodiment, the precipitation solution prior to the first cooling step can include water in an amount of from about 3 wt. % to about 10 wt. %, from about 4 wt. % to about 7 wt. % by weight of the precipitation solution. For instance, the precipitation solution can include about 5% by weight water in some embodiments.

It may be desired to add water to or remove water from the polymerization solution to provide the precipitation solution with the desired amount of water. For example, in one embodiment, the polymerization solution can be a near-anhydrous solution and can include little or no water. For instance, the polymerization solution exiting the reactor 104 can be less than about 2 wt. % or less than about 1 wt. % water, for example between 0 and about 2 wt. % water. In such an embodiment, it may be desirable to add water to the polymerization solution in forming the precipitation solution.

The precipitation solution can also include an organic solvent. In general, the solvent of the precipitation solution can include an organic amide solvent that is used in formation of the polyarylene sulfide. Exemplary organic amide solvents can include, without limitation, N-methyl-2-pyrrolidone (NMP); N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof.

It has been found that the relative amount of the organic solvent in the precipitation solution can be varied to affect the particle size distribution of the precipitated particles. For example, in one embodiment the amount of the organic solvent in the precipitation solution can be such that the ratio of organic solvent to sulfur can be from about 2 moles of solvent per monomer unit of polyarylene sulfide formed during the process to about 5 moles of solvent per monomer unit of the polyarylene sulfide formed during the process, from about 3 moles per monomer unit to about 4.5 moles per monomer unit, or from about 3.5 moles per monomer unit to about 4.5 moles per monomer unit in some embodiments.

In one embodiment, the precipitation solution can include from about 15 wt. % polyarylene sulfide with regard to the weight of organic solvent to about 30 wt. % polyarylene sulfide with regard to the weight of organic solvent. For example, the precipitation solution can include about 25 wt. % polyarylene sulfide with regard to the weight of organic solvent in the precipitation solution.

The pH of the precipitation solution can also affect the particle integrity and fines levels of the precipitated particles as well as downstream. For instance, it has been discovered that a precipitation solution having a pH that is slightly acidic or slightly basic, i.e., not a neutral pH, can exhibit improved particle integrity. For example, the pH of the precipitation solution can be somewhat basic with a pH of from about 8 to about 12 or can be somewhat acidic with a pH of from about 2 to about 6. In one embodiment, the polymerization solution can be alkaline, as discussed further herein. Thus, acid can be added to the polymerization solution in one embodiment to provide a precipitation solution with a predetermined pH.

While any acid that will not deteriorate the polymer can be used, in general, a relatively weak acid, such as acetic acid can be added to the polymerization solution.

In the course of formation of the polyarylene sulfide, discussed further herein, an organic amide solvent can be hydrolyzed to form an organic amine, which is believed to function as a surfactant in the polymer composition. While not wishing to be bound to any particular theory, it is believed that the addition of an acid to the precipitation solution can neutralize the organic amine and convert it back to the organic amide, and thus improve the precipitation process. Another possible theory is that the surface characteristics of coalescing droplets or molten particulates is affected by the pH of the mixture thus affecting the particle characteristics of the final product. In any case, it may prove beneficial to include an amount of an acid in the precipitation solution.

The molar amount of acid that can be included in the precipitation solution can be equivalent to the molar amount of hydrogen sulfide by-product formed during formation of the polymer. The amount of hydrogen sulfide by-product formed during the polymer formation can vary, as is known, but in general can be about 20 mol % or less that the total amount of sulfur (in moles) added to the process, for example from about 1 mol % to about 15 mol %, from about 2 mol % to about 10 mol %, or from about 3 mol % to about 4 mol % of the total sulfur added to the entire formation process.

If additional components such as an acid and/or water are added to the polymerization solution to form the precipitation solution, it may be preferred in some embodiments to pre-heat the additional components, so as to avoid excessive alteration of the temperature profile of the precipitation solution and subsequent variation in the multi-step cooling process. For instance, prior to combination with the polymer, any additives can be pre-heated such that the precipitation solution has an initial temperature of about 230° C. or greater. For instance, the additives to be included in the precipitation solution can be pre-heated to a temperature about equal to that of the polymerization solution prior to combination. In other embodiments, the additives can be heated, but not necessarily to the same temperature as the polymerization solution. For instance, the additives can be pre-heated to a temperature of from about 50° C. to about 250° C., or from about 80° C. to about 200° C. prior to combination with the polymerization solution.

Other components of the precipitation solution that can affect the precipitated particle characteristics can include salts and polyarylene sulfide oligomers. An amount of these components can be carried over in the polymerization solution. It may be beneficial to remove all or a portion of such components (e.g., by-products of the polymerization reactions) prior to the precipitation process. For example, the precipitation solution can have an amount of polyarylene sulfide oligomers (i.e., polyarylene sulfide having a number average molecular weight of about 20,000 Daltons or less, about 15,000 Da or less, or about 10,000 Da or less in some embodiments) of about 10 wt. % by weight of the precipitation solution or less, about 5 wt. % or less, about 2 wt. % or less, or about 1.5 wt. % by weight of the precipitation solution or less in some embodiments.

In some embodiments, discussed further herein, the formation process can include a salt removal step. Such a salt removal step can remove at least a portion of salt by-products such that the polymerization solution has little or no salts (e.g., sodium chloride, potassium chloride, lithium chloride, etc. that may be formed during the polymerization reaction). Additional salt removal may be employed prior to the precipitation process, though this is not a requirement and in some embodiments, there need not be a salt removal process between the reactor 104 and the precipitation reactor 106. For instance, the precipitation solution can include salts (e.g., sodium chloride and/or other salts) in an amount of about 10 mole of salts per mole of sulfur, or less in some embodiments, such as about 5 mole per mole of sulfur, about 2 mole per mole of sulfur, or about 1 mole of salts per mole of sulfur.

The precipitated particles can exhibit good particle integrity, which can be evidenced by the bulk density of the polyarylene sulfide. For example, the bulk density of the polyarylene sulfide can be between about 0.2 grams per cubic centimeter (g/cm$^3$) and about 1.5 g/cm$^3$, for instance between about 0.3 g/cm$^3$ and about 1 g/cm$^3$ or between about 0.5 g/cm$^3$ and about 0.9 g/cm$^3$ as determined according to ISO Test No. 1183 (technically equivalent to ASTM D792).

The particle size distribution of the particles can be beneficial for downstream processing and product handling. For instance, the $d_{10}$ of the particles can be from about 10 micrometers (μm) to about 100 μm, the $d_{50}$ of the particles can be from about 800 μm to about 2000 μm and the $d_{95}$ can be from about 2000 μm to about 3000 μm. The particle size distribution value $d_x$ is the standard definition as is known in the art, i.e., $d_x$ is the particle diameter at x % of the cumulative particle size distribution.

In one embodiment, about 95% or more of the particles can be between about 50 micrometers and about 2000 micrometers in particle size. In one embodiment, about 0.5 wt. % or less of the particles can have a diameter of greater than about 2800 micrometers, and about 10 wt. % or less of the polymers can have a diameter of less than about 100 micrometers. Particle size analysis can be carried out via laser diffraction of sample particles according to known methodology.

The polyarylene sulfide particles can also exhibit desirable porosity, which can improve washing and subsequent purity of the polymer. For instance, the polyarylene sulfide can exhibit a pore area of from about 35 m$^2$/g to about 60 m$^2$/g, and a volume of porosity to volume of polymer ratio of from about 0.3 to about 0.6 in some embodiments. Pore area and porosity can be determined according to DIN 66 133. This method is based on the intrusion of mercury as a non-wetting liquid into a solid and porous material under pressure. Depending on pore size a specific pressure has to be applied in order to push mercury into the pores against the opposing force of the mercury's surface tension. By registration of the needed pressure pore size and porosity can be calculated via the Washburn equation.

A polyarylene sulfide can exhibit other beneficial characteristics as well. For instance, the melt viscosity of the neat polymer (i.e., no additives) as determined according to ISO Test No. 11443 at 310° C. and 1,200/seconds can be from about 200 poise to about 6000 poise, for instance, from about 200 poise to about 2000 poise, or from about 450 poise to about 1500 poise in one embodiment.

The volatile content of the polymer can be about 0.5 wt. % or less, for instance about 0.3 wt. % or less, based upon weight loss following vacuum drying. A polyarylene sulfide can also have low impurities, for instance less than about 10,000 ppm solvent, less than about 1100 ppm dihaloaromatic monomer, less than about 100 ppm sodium chloride, and/or less than about 0.5% ash.

The thermal properties of the polyarylene sulfide can also be beneficial. For instance, the crystallization temperature, $T_{c2}$, can be between about 190° C. and about 300° C., for example between about 200° C. and about 265° C., as determined by differential scanning calorimetry, for instance as described in ISO Standard 10350. The glass transition temperature can be between about 90° C. and about 100° C., for instance between about 90° C. and about 95° C. as determined according to ISO standard 11357. The melting temperature can be between about 270° C. and about 300° C. as determined according to ISO standard 11357. The deflection temperature under load (DTUL) can be between about 100° C. and about 120° C. as determined according to ISO Test No. 75-2 (technically equivalent to ASTM D648-07). The heat resistance according to method A of ISO 75 at 1.82 MPa can be between about 110° and about 120° (greater than about 250° for glass fiber filled compositions) and the heat resistance according to method D of ISO 75 at 8 MPa can be between about 85° and about 100° C. (greater than about 180 for glass fiber filled compositions).

Tensile properties of the polyarylene sulfide can be determined according to ISO Test No. 527 (technically equivalent to ASTM D638). For instance the tensile modulus can be from about 2,000 N/mm$^2$ to about 20,000 N/mm$^2$, or from about 3,000 N/mm$^2$ to about 4,000 N/mm$^2$ in some embodiments. A glass fiber filled thermoplastic composition including the polyarylene sulfide can exhibit a tensile modulus of about 15,000 N/mm$^2$ or greater. The break stress of the polyarylene sulfide can be from about 20 to about 70 MPa, and the elongation at break can be from about 1.5% to about 2%. The tensile strength of a polyarylene sulfide can be, e.g., from about 40 N/mm$^2$ to about 100 N/mm$^2$, and a glass fiber filled composition including the polyarylene sulfide can have a tensile strength of about 150 N/mm$^2$ or greater.

Flexural properties of the polyarylene sulfide can be determined according to ISO Test No. 178 (technically equivalent to ASTM D790). For instance, the flexural strength of the polyarylene sulfide can be from about 100 N/mm² to about 150 N/mm², or from about 120 N/mm² to about 140 N/mm² in some embodiments. A glass fiber filled thermoplastic composition including the polyarylene sulfide can exhibit a flexural strength of about 250 N/mm² or greater. The flex E modulus of the polyarylene sulfide can be from about 3,000 N/mm² to about 5,000 N/mm², or from about 3,500 N/mm² to about 4,000 N/mm² in some embodiments. A glass fiber filled thermoplastic composition including the polyarylene sulfide can exhibit a flex E modulus of about 15,000 N/mm² or greater. The bending strength at break of a polyarylene sulfide can be about 3% or greater, for instance from about 4% to about 6% in some embodiments.

The Notched Charpy properties can be determined according to ISO Test No. ISO 179-1 (technically equivalent to ASTM D256, Method B). For instance, a glass fiber filled composition including the polyarylene sulfide can have a Notched Charpy strength of about 10 mJ/mm² or greater.

The Unnotched Charpy properties can be determined according to ISO Test No. 180 at 23° C. (technically equivalent to ASTM D256). For instance, a glass fiber filled composition including the polyarylene sulfide can have an Unnotched Charpy strength of about 40 mJ/mm² or greater.

The Notched Izod properties can be determined according to ISO Test No. 180 (technically equivalent to ASTM D256, Method A). For instance a glass fiber filled composition including the polyarylene sulfide can have a Notched Izod strength of about 30 mJ/mm² or greater, for instance from about 30 mJ/mm² to about 50 mJ/mm².

The Unnotched Izod properties can be determined according to ISO Test No. 180/1 U. For instance a glass fiber filled composition including the polyarylene sulfide can have an Unnotched Izod strength of about 5 mJ/mm² or greater, for instance from about 5 mJ/mm² to about 20 mJ/mm².

While the process utilized to form the polyarylene sulfide is not limited, in one embodiment, the polyarylene sulfide can be formed in a multi-stage process as is illustrated in FIG. 1. For example, the multi-stage process can include at least three separate formation stages that can take place in three different reactors 100, 102, 104. The first stage of the formation process can include reaction of an alkali metal sulfide with an organic amide solvent to form a complex including a hydrolysis product of the solvent and alkali metal hydrogen sulfide. The second stage of the formation process can include a first polymerization reaction between the complex formed in the first stage and a dihaloaromatic monomer to form a prepolymer, and the third stage can include a second polymerization reaction between the prepolymer and additional monomers to form the final polyarylene sulfide.

Alternatively, the three stages of the formation process can be carried out in a single reactor or in two reactors. For instance, the complex formation and the first polymerization reaction of the process can be carried out in a single reactor, following which the prepolymer can be transferred to a second reactor for the second polymerization reaction. Alternatively, the complex can be first formed in a first reactor, and then the first and second polymerization reactions can be carried out sequentially in a second reactor.

Referring again to the three reactor system of FIG. 1, the first reactor 100 can be utilized for a first stage of the process during which an organic amide solvent and an alkali metal sulfide can be reacted to form a complex that includes a hydrolysis product of the organic amide solvent and an alkali metal hydrosulfide.

Organic amide solvents as may be used include those mentioned above such as, and without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof.

The alkali metal sulfide can be, for example, lithium sulfide, sodium sulfide, potassium sulfide, rubidium sulfide, cesium sulfide or a mixture thereof. An alkali metal sulfide can also be generated in situ. For instance, a sodium sulfide hydrate can be prepared within the first reactor 100 from sodium hydrogen sulfide and sodium hydroxide that can be fed to the reactor.

When a combination of alkali metal hydrogen sulfide and alkali metal hydroxide are fed to the reactor 100 to form the alkali metal sulfide, the molar ratio of alkali metal hydroxide to alkali metal hydrogen sulfide can be between about 1.00 and about 1.03. In any case, a small amount of an alkali metal hydroxide can be included in the first reactor 100 to remove or react impurities (e.g., to change such impurities to harmless materials) such as an alkali metal polysulfide or an alkali metal thiosulfate, which may be present in a very small amount with the alkali metal sulfide. Thus, even in those embodiments in which an alkali metal sulfide is not generated in situ via the alkali metal hydrogen sulfide reaction, an amount of an alkali metal hydroxide may be included in the process in conjunction with the alkali metal sulfide.

In the embodiment illustrated in FIG. 1, the feed to the first reactor 100 can include sodium sulfide (Na₂S) (which can be in the hydrate form), N-methyl-2-pyrrolidone (NMP) and water. Reaction between the water, sodium sulfide and the NMP can form a complex including sodium methylaminobutyrate (SMAB—a hydrolysis product of NMP) and sodium hydrogen sulfide (NaSH) (SMAB-NaSH) according to the following reaction scheme:

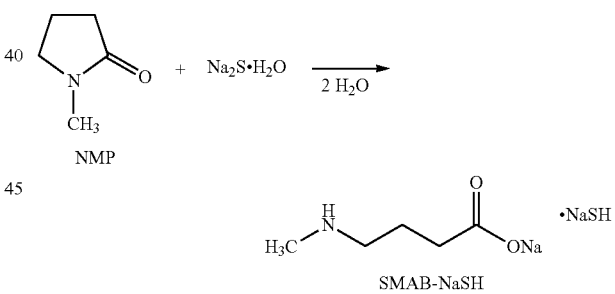

According to one embodiment, a stoichiometric excess of the alkali metal sulfide can be utilized in the first stage reactor, though this is not a requirement of the formation stage. For instance, the molar ratio of sulfur to organic amide solvent in the feed can be from about 2 to about 4, or from about 2.5 to about 3. The molar ratio of water to sulfur in the feed can generally be from about 2 to about 4, from about 2 to about 3, or from about 2.5 to about 3 in some embodiments.

During the formation of the complex, the pressure within the reactor 100 can be held at or near atmospheric pressure, which can provide cost savings to the process. To maintain the low pressure reaction conditions, vapor can be removed from the reactor. The main constituents of the vapor can include water and hydrogen sulfide by-product. As illustrated in FIG. 1, hydrogen sulfide of the vapor can be separated at 106 (e.g., a condenser) with liquid constituents returned to the reactor. Unfortunately, loss of sulfur from the process in the form of hydrogen sulfide leads to increased costs. This can be mitigated by retention of the hydrogen sulfide in the liquid constituents of the process.

As previously mentioned, in one embodiment the reactor feed can include a stoichiometric excess of the sulfur-containing monomer (e.g., the alkali metal sulfide and/or alkali metal hydrogen sulfide). As a result, the product solution including the SMAB-NaSH complex can be highly alkaline. This alkaline solution can act as an absorber for the hydrogen sulfide in the reactor 100 and can lower loss of sulfur in the vapor stream from the reactor 100. Loss of sulfur through hydrogen sulfide in the vapor leads to loss of sulfur necessary for the polymerization reactions. Improved retention of the sulfur will improve overall conversion rates of the process.

A portion of the water that is separated at condenser 106 can be returned to the reactor 100 to maintain the reaction conditions. Another portion of the water can be removed so as to dehydrate the SMAB-NaSH solution formed in this stage such that the water concentration during the first polymerization reaction is relatively low. For instance, the molar ratio of oxygen to sulfur (or water to sulfur-containing monomer (e.g., SMAB-NaSH)) in the solution that is provided to the first polymerization reaction, which, in the illustrated embodiment is the solution that exits the reactor 100, can be less than about 1.5, or can be between about 0.1 and about 1 in some embodiments. Thus, the solution that is fed to the reactor 102 in which the prepolymer is formed can be near-anhydrous. In other embodiments, the solution feed to the polyarylene sulfide prepolymer polymerization reaction can be higher in water concentration, though still relatively low. For instance, the molar ratio of oxygen to sulfur in the prepolymer polymerization reaction feed can be about 4 or less, about 3 or less, for example from about 2 to about 3 in some embodiments.

The reactor utilized for the SMAB-NaSH formation can be stainless steel, though improved corrosion can be obtained by use of other materials such as a nickel-based alloy or titanium. The materials in the first reactor 100 can be heated to a temperature of, for example, between about 140° and about 220° C., for instance from about 150° C. to about 210° C., or from about 165° C. to about 200° C. during the complex formation reaction. The complex formation reaction is an exothermic reaction, and suitable temperature control mechanisms can be utilized to maintain desired reaction conditions, as needed. The reaction can be carried out in a batch-wise or continuously.

The SMAB-NaSH complex can be fed to the second reactor 102 in conjunction with a dihaloaromatic monomer and a suitable solvent so as to form the polyarylene sulfide prepolymer i. A dihaloaromatic monomer can be, without limitation, a dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic monomers may be used either singly or in any combination thereof. Specific exemplary dihaloaromatic monomers can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom of the dihaloaromatic monomer can be fluorine, chlorine, bromine or iodine, and two halogen atoms in the same dihaloaromatic monomer may be the same or different from each other. In one embodiment, o-dichlorobenzene, m-dichlorobenzene, p-dichlorobenzene or a mixture of 2 or more monomers thereof is used as the dihaloaromatic monomer.

The polyarylene sulfide may be a homopolymer or may be a copolymer. By a suitable, selective combination of dihaloaromatic monomers, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

(II)

and segments having the structure of formula (III):

(III)

or segments having the structure of formula (IV):

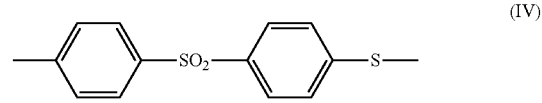

(IV)

In another embodiment, a copolymer can be formed and a monomer can be charged to the system having the formula (V):

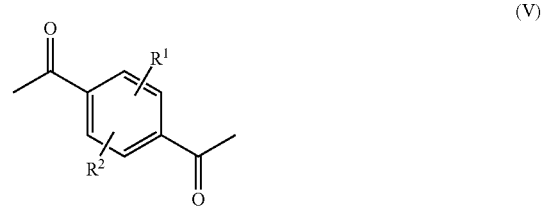

(V)

where the radicals $R^1$ and $R^2$, independently of one another, are a hydrogen, fluorine, chlorine or bromine atom or a branched or unbranched alkyl or alkoxy radical having from 1 to 6 carbon atoms. In one embodiment, a monomer of formula (V) can be p-hydroxybenzoic acid or one of its derivatives Another monomer as may be charged to the system can have a structure of the formula (VI):

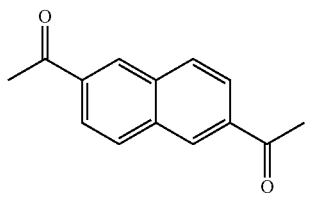 (VI)

One example of a monomer of formula (VI) is 2-hydroxynaphthalene-6-carboxylic acid. Monomers of the formula V and VI may be both charged to the system to form a polyarylene sulfide copolymer.

A polyarylene sulfide copolymer can include a segment derived from a polyarylene sulfide structure of the formula (VII):

$$-[\text{Ar}-\text{S}]_q \qquad (\text{VII})$$

where Ar is an aromatic radical, or more than one condensed aromatic radical, and q is a number from 2 to 100, in particular from 5 to 20. The radical Ar in formula (VII) may be a phenylene or naphthylene radical. In one embodiment, the second segment may be derived from poly(m-thiophenylene), from poly(o-thiophenylene), or from poly(p-thiophenylene).

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be formed that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups.

By way of example, monomer components used in forming a semi-linear polyarylene sulfide can include an amount of polyhaloaromatic monomers having 2 or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic monomers having more than two halogens substituted per molecule that can be employed in forming a semi-linear starting polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

In the illustrated embodiment, the dihaloaromatic monomer can include p-dichlorobenzene (pDCB), as shown. Of course, other dihaloaromatic monomers, optionally in conjunction with tri- or higher order polyhaloraromatic monomer are encompassed herein. In general, the total amount of the polyhaloaromatic monomer(s) (including dihaloaromatic monomers) per mole of the effective amount of the charged sulfur-containing monomer can be from about 0.8 to about 2.0 moles, or greater than 1 in one embodiment, such as from about 1 to about 1.5 moles, or from about 1.08 to about 1.2 moles. For instance, the ratio of polyhaloaromatic monomer(s) to sulfur in the first polymerization reaction can be about 1.10 in some embodiments. Thus, the polyarylene sulfide can include alkyl halide (generally alkyl chloride) end groups in some embodiments. The relatively low ratio of the polyhaloaromatic monomer to the sulfur-containing monomer, e.g., the alkali metal hydrogen sulfide of the complex, can be favorable for the formation of the final high molecular weight polymer via the condensation polymerization reaction.

The ratio of solvent to sulfur in the prepolymer formation polymerization reaction can also be relatively low. For example, the ratio of the total amount of organic amide solvent in this polymerization reaction (including the solvent added at the reactor and solvent remaining in a previously formed complex solution) to the sulfur-containing monomer (e.g., SMAB-NaSH) can be from about 2 to about 2.5, or from about 2.2 to about 2.3 in some embodiments. Excess of the sulfur-containing monomer can increase the alkalinity of the reaction solution, which can increase retention of sulfur in the process as discussed previously via absorption of $H_2S$. In balance to this, however, decrease in this ratio can increase the concentration of reactants in the polymerization reaction, which can increase the relative polymerization rate and the per volume polymer production rate.

The polymerization reaction to form the polyarylene sulfide prepolymer can be carried out under an inert atmosphere, such as nitrogen, and at increased pressure. For instance, the pressure in the reactor 102 during the second stage can be from about 500 kPa to about to about 1600 kPa, from about 600 kPa to about 1500 kPa, or from about 700 kPa to about 1400 kPa.

The reactor 102 can include a vapor outlet for removal of vapor during the polymerization reaction in order to maintain the desired pressure level. For instance, the reactor 102 can include a pressure relief valve as is known in the art. Vapor removed from the reactor 102 can be condensed and separated as at separator 108, for instance to recover unreacted monomer for return to the reactor 102. A portion of the water of the vapor can be removed and a portion of the water can be returned to the reactor to maintain the low water conditions during the polymerization reaction. A small amount of water in the reactor can generate reflux in the top of the reactor 102, which can improve separation between the water phase and the organic solvent phase in the reactor. This can in turn minimize loss of the organic solvent in the vapor phase removed from the reactor 102 as well as minimize loss of hydrogen sulfide in the vapor stream due to absorption of the hydrogen sulfide by the highly alkaline reaction solution as discussed previously.

The polymerization reaction to form the polyarylene sulfide prepolymer can generally be carried out at a temperature of from about 200° C. to about 280° C., or from about 230° C. to about 260° C. In one embodiment, the temperature can be raised in steps with addition of the reactants. For instance, the organic solvent can be heated to a temperature of from about 150° C. to about 200° C., for instance from about 170° C. to about 190° C. at which point the dihaloaromatic monomer (in conjunction with any other polyhaloaromatic monomers) can be added. Following, the mixture can be further heated, for instance to a temperature of from about 180° C. to about 220° C., or from about 190° C. to about 210° C. at which point the sulfur-containing monomer (e.g., SMAB-NaSH) can be added. The temperature and pressure can then be controlled during the polymerization. For instance, the temperature can be held at from about 230° C. to about 260° C. and the pressure can be held at atmospheric or above atmospheric (from about 100 KPa to about 400 kPa above atmospheric). The duration of the first polymerization reaction can be, e.g., from about 0.5 to about 15 hours, or from about 1 to about 5 hours.

The termination of the first polymerization reaction during which the prepolymer is formed is generally that point at which the conversion rate of the dihaloaromatic monomer in the second reactor 102 reaches not less than about 50 mol %, not less than about 70 mol %, or not less than about 90 mol % of the theoretical conversion. The theoretical conversion of the dihaloaromatic monomer can be calculated from one of the following formulas:

(a) In the case wherein the dihaloaromatic monomer has been added in excess (by molar ratio) of the alkali metal sulfide:

$$\text{Conversion rate} = \frac{X-Y}{X-Z} \times 100$$

(b) In the cases other than (a):

$$\text{Conversion rate} = \frac{X-Y}{X} \times 100$$

wherein X is the amount of the charged dihaloaromatic monomer; Y is the remaining amount of the dihaloaromatic monomer and Z is the excessive amount of dihaloaromatic monomer in moles.

(c) In the case other than (a) or (b)

Conversion rate=$A/B$*100

Wherein A is the total weight of salt collected after removal of the residual polymer and other species other than salt by-product; B is the theoretical weight of salt which is two times the molar amount of the effective sulfide present during the polymerization.

Following the first polymerization reaction, the mean molar mass of the prepolymer as expressed by the weight average molecular weight, $M_w$, can be from about 500 g/mol to about 30,000 g/mol, from about 1000 g/mol to about 20,000 g/mol, or from about 2000 g/mol to about 15,000 g/mol.

The polymerization reaction apparatus for use in the formation of the polyarylene sulfide prepolymer is not especially limited, although it is typically desired to employ an apparatus that is commonly used in formation of high viscosity fluids at increased pressure. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. The reactor 102 can be stainless steel, though improved corrosion can be obtained by use of other materials such as a nickel-based alloy or titanium.

Following the formation of the prepolymer, the solution that exits reactor 102 can include the prepolymer, the solvent, unreacted monomer, water, and other by-products of the reaction such as salts that are formed during the polymerization reaction. Salts that may be present in the post-reaction prepolymer mixture can include those formed as a byproduct during the reaction as well as other salts added to the reaction mixture, for instance as a reaction promoter. For example, the proportion by volume of salts present in the solution exiting the reactor 102 can be from about 0.05 to about 0.25, or from about 0.1 to about 0.2 in some embodiments. The salts can be organic or inorganic, i.e. can consist of any combination of organic or inorganic cations with organic or inorganic anions. They can be at least partially insoluble in the reaction medium (which may vary depending on the conditions of the medium) and can have a density different from that of the solvent and/or other liquids of the mixture.

According to one embodiment, at least a portion of the salts in the prepolymer mixture that exits the reactor 102 can be removed from the mixture at a separation unit 105 prior to the second polymerization in reactor 104 within which the molecular weight of the prepolymer is increased. Removal of salts prior to this second polymerization reaction can simplify final polymer separation processes as well as increase the reaction rate of the second polymerization as a lower sulfur to solvent ratio may be used in the reaction, effectively increasing the polymer concentration and formation rate. In addition, by carrying out a salt separation process prior to the second polymerization reaction, the physical capacity of the third reactor for the reactants can be increased.

The separation method utilized at separation unit 105 to remove salts from the prepolymer solution is not particularly limited. For instance, the salts can be removed by use of screens or sieves as has been utilized in traditional separation processes. A salt/liquid extraction process can alternatively or additionally be utilized in separating the salt from the prepolymer solution. In one embodiment, a hot filtration process can be utilized in which the solution can be filtered at a temperature at which the prepolymer is in solution and the salts are in the solid phase.

According to one embodiment, a salt separation process can remove about 95% or more of the salts present in the prepolymer solution that exits the reactor 102. For instance greater than about 97%, about 98% or about 99% of the salts can be removed from the solution.

Referring again to FIG. 1, a second polymerization reaction can take place in reactor 104 during which the molecular weight of the prepolymer can be increased to form the product polyarylene sulfide.

According to one embodiment, this second polymerization reaction can be carried out at near anhydrous conditions, e.g., in which the water to sulfur molar ratio in the reactor feed can be about 5 or less, about 4 or less, or about 2 or less. In one embodiment, the water to sulfur molar ratio in the reactor 104 can be from about 2 to about 3, or even lower in some embodiments, with the molar ratio of water to the sulfur-containing monomer about 0.2 or less, for instance between 0 and about 0.2. The low water content during the second polymerization reaction can increase the polymerization rate and the polymer yield as well as reduce formation of undesired side reaction by-products as the conditions are favorable for the nucleophilic aromatic substitution of the polymerization reaction. Moreover, as pressure increases during the reaction are generally due to water vaporization, low water content can allow the second polymerization reaction to be carried out at a relatively low pressure, for instance about 1500 kPa or less. As such, the reactor 104 need not be a high pressure reactor, which can provide substantial cost savings to a formation process as well as decrease safety risks inherent to high pressure reactors. The lower pressures possible during the polymerization reactions can also decrease safety risks.

In one embodiment, water and/or solvent can be removed from the reaction solution by a distillation process in order to control the relative amount of the water and/or solvent present during the second polymerization reaction. Any distillation or other fluid separation process can be utilized. In one particular embodiment, a flash distillation process can be utilized. A distillation can be carried out in one embodiment either prior to or following feed of the solution from reactor 102 to reactor 104. For example, a flash distillation can take place following transfer of the reaction solution from reactor 102 to reactor 104. According to this embodiment, the reactor can be quickly depressurized from the pressure conditions during the first polymerization reaction (e.g., from about 500 kPa to about 1600 kPa) to release superheated vapor containing water and solvent. A flash distillation process can also serve to reduce the temperature of the mixture prior to the second polymerization reaction. For instance, the temperature of the feed can be reduced from about 250° C. (or higher) to about 220° C. (or less) upon the flash distillation process.

Input to the reactor 104 can include the prepolymer solution from the reactor 102 in addition to any solvent, dihaloaromatic monomer(s), and sulfur-containing monomer(s) necessary to reach the final targeted polymer molecular weight. For instance, the amount of a sulfur-containing monomer added at the second polymerization reaction can be about 10% or less of the total amount required to form the product polyarylene sulfide. For instance, about 90% or more of sulfur-containing monomer(s) can be added to the feed prior to the first polymerization reaction and about 10% or less of sulfur-containing monomer(s) can be added following the first polymerization reaction and prior to the second polymerization reaction. In the embodiment illustrated in FIG. 1, the sulfur-containing monomer is sodium sulfide, but this is not a requirement of the third stage, and other sulfur containing monomers and mixtures of sulfur-containing monomers may alternatively be utilized.

Dihaloaromatic monomers added for the second polymerization reaction can be the same or different as the dihaloaromatic monomers utilized in the first polymerization reaction. For example, a monohalo monomer (and not necessarily an aromatic compound) can be included in one or both of the polymerization reactions in order to form non-reactive end groups of the polyarylene sulfide or to regulate the polymerization reaction and/or the molecular weight of the polyarylene sulfide. In some embodiments, suitable amount of the dihaloaromatic monomer added for the first polymerization reaction can remain unreacted following the first polymerization, in which case it may not be necessary to add additional dihaloaromatic monomer prior to the second polymerization reaction, i.e., the dihaloaromatic monomer in the second polymerization reaction can be unreacted monomer carried over from the first polymerization reaction.

The reaction conditions within the reactor 104 can also include a relatively low molar ratio of the solvent to the formed polymer. For instance, the ratio of solvent to the formed polyarylene sulfur polymer can be from about 2 moles of solvent per monomer unit of the polyarylene sulfide formed in the reaction to about 5 moles of solvent per monomer unit of the polyarylene sulfide formed in the reaction, from about 3 moles per monomer unit to about 4.5 moles per monomer unit, or from about 3.5 moles per monomer unit to about 4.5 moles per monomer unit in some embodiments.

The reactor 104 can include a vapor outlet for removal of vapor during the second polymerization reaction in order to maintain the low pressure in the reactor. For instance, the reactor 104 can include a pressure relief valve as is known in the art. Vapor removed from the second polymerization can be condensed and separated as at separator 110 that can separate, e.g., hydrogen sulfide from water of the vapor. The removal of the water can also help to maintain the desired low water conditions in the reactor 104.

The second polymerization can take place at a temperature of from about 120° C. to about 280° C., or from about 200° C. to about 260° C. and the polymerization can continue until the melt viscosity of the formed polymer is raised to the desired final level. For instance, in one embodiment, the feed to the reactor can include the prepolymer solution from the reactor 102, additional dihaloaromatic monomer, and additional sulfur-containing monomer. Following feeding to the reactor 104 and any flash distillation process, the solution can be heated (if necessary) to a temperature of from about 220° C. to about 260°, such as from about 230° C. to about 250° C. This solution can then be held for a period of time (e.g., from about 1 hour to about 5 hours) following which additional solvent may be added as necessary and by an additional period of polymerization to reach the targeted molecular weight.

The duration of the second polymerization step can be, e.g., from about 0.5 to about 20 hours, or from about 1 to about 10 hours. The number average molecular weight of the formed polyarylene sulfide can vary as is known, but in one embodiment can be from about 15,000 g/mol to about 500,000 g/mol, from about 20,000 g/mol to about 300,000 g/mol, or from about 30,000 g/mol to about 100,000 g/mol. Molecular weight can be determined for instance by gas chromatograph according to standard methodology. The polydispersity index of the polyarylene sulfide can be, for example, from about 2 to about 4, or from about 2.25 to about 3.5 in some embodiments.

The apparatus for use in the second polymerization is not especially limited, and can be the same or different as the reaction apparatus utilized in the first polymerization reaction, e.g., a reaction apparatus that is commonly used in formation of high viscosity fluids at increased pressure. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. The reactor 104 can be stainless steel, though improved corrosion can be obtained by use of other materials such as a nickel-based alloy or titanium.

Following the second polymerization reaction, the precipitation process can be carried out as well as any desired additional post-formation processing. Commonly, the polyarylene sulfide may be discharged following any desired post-processing through a perforated die to form strands that are taken up in a water bath, pelletized and dried. The polyarylene sulfide may also be in the form of a strand, granule, or powder comprising the precipitated polymer particles.

Figure 2:
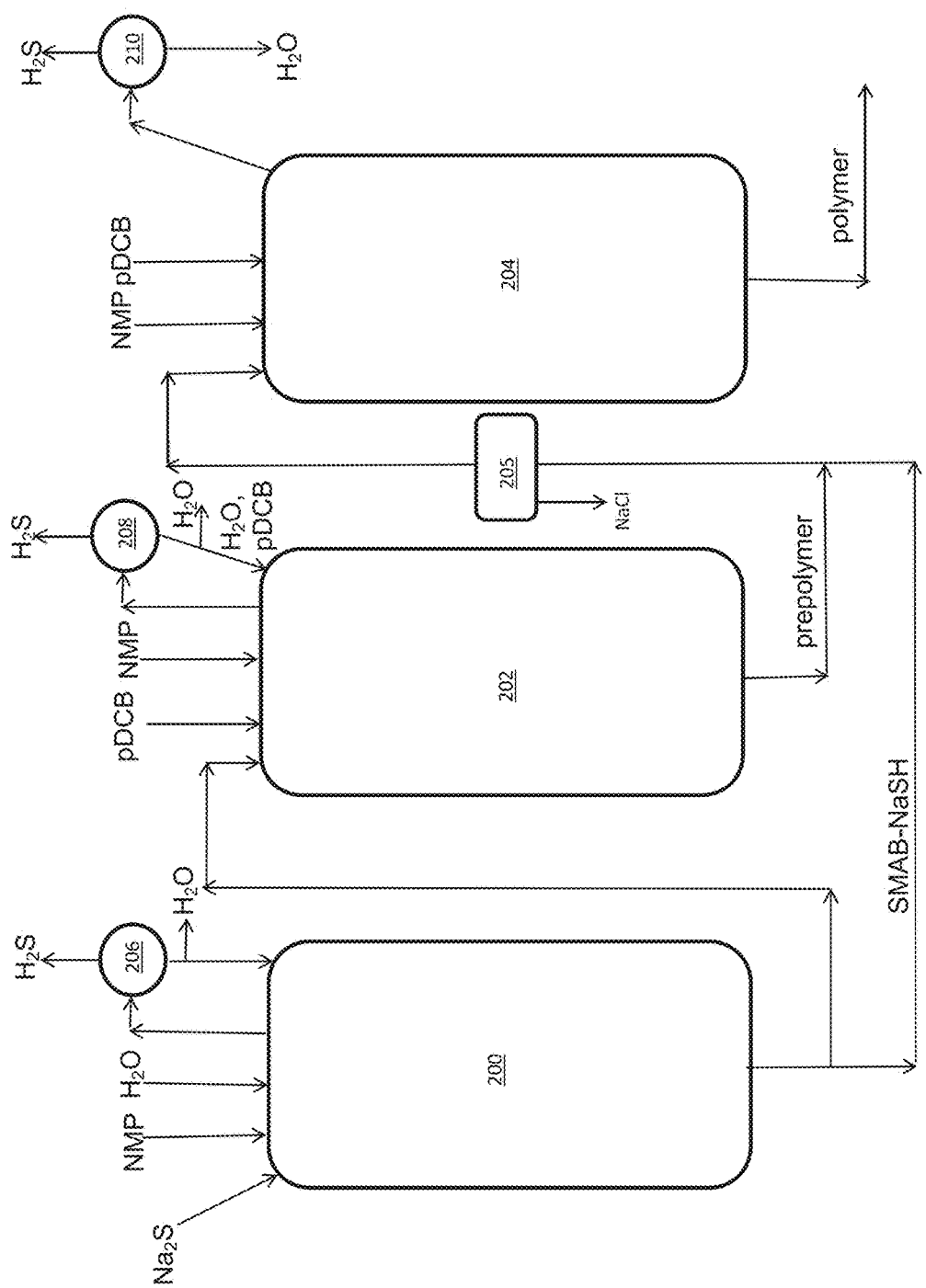
FIG. 2 is a flow diagram for another embodiment of a polyarylene sulfide formation process as described herein.

FIG. 2 illustrates another embodiment of a multi-stage polyarylene sulfide formation process. As can be seen, this process is similar to the multi-stage process of FIG. 1 and includes a reactor 200, a reactor 202 and a reactor 204. The feed to the reactor 200 can include a sulfur-containing monomer, such as an alkali metal sulfide (e.g., Na$_2$S), an organic amide solvent (e.g., NMP), and water. The reactor 200 can include a vapor treatment stream including a condenser 206 similar to that of FIG. 1. The sulfur-containing organic complex formed in the reactor 200 can be fed to the reactor 202 in conjunction with a dihaloaromatic monomer (pDCB) and solvent (NMP) to form a prepolymer via a first polymerization reaction. As shown, the reactor 202 can include a vapor treatment stream including a condenser 208 similar to that of FIG. 1. The prepolymer solution that exits the reactor 202 can be subjected to salt separation at separation unit 205 before entering the reactor 204 for the second polymerization reaction.

According to this embodiment, the sulfur-containing monomer fed to the reactor 204 can include the sulfur-containing organic complex that was formed in the reactor 200. Utilization of the complex in both the first and second polymerization reactions can improve overall efficiency of the process and decrease costs of the process.

The complex can be fed to the reactor 204 in conjunction with dihaloaromatic monomer and additional solvent as necessary and the molecular weight of the prepolymer can be increased as desired. As shown, the reactor 204 can include a vapor treatment stream including a condenser 210 and water can be removed from the reactor 204 in order to maintain low water and low pressure during the second polymerization reaction.

Following the second polymerization reaction, post treatment as is generally known in the art can be carried out to purify or otherwise improve the characteristics of the polyarylene sulfide formed by the process. For example, a second filtration process can be carried out that can remove any additional salt from the product mixture, for instance any salt formed as the molecular weight of the prepolymer is increased during the second polymerization reaction.

Following formation, the polyarylene sulfide may be washed with liquid media. For instance, the polyarylene sulfide may be washed with water, acetone, N-methyl-2-pyrrolidone, a salt solution, and/or an acidic media such as acetic acid or hydrochloric acid. The polyarylene sulfide can be washed in a sequential manner that is generally known to persons skilled in the art. The polyarylene sulfide can be subjected to a hot water washing process. The temperature of a hot water wash can be at or above about 100° C., for instance higher than about 120° C., higher than about 150° C., or higher than about 170° C. Generally, distilled water or deionized water can be used for hot water washing. In one embodiment, a hot water wash can be conducted by adding a predetermined amount of the polyarylene sulfide to a predetermined amount of water and heating the mixture under stirring in a pressure vessel. By way of example, a bath ratio of up to about 200 grams of polyarylene sulfide per liter of water can be used. Following the hot water wash, the polyarylene sulfide can be washed several times with warm water, maintained at a temperature of from about 10° C. to about 100° C. A wash can be carried out in an inert atmosphere to avoid deterioration of the polymer.

In one embodiment, organic solvent washing can be combined with hot water washing and/or warm water washing. When a high-boiling-point organic solvent such as N-methylpyrrolidone is used, the residual organic solvent can be removed by washing with water or warm water after the organic solvent washing, and distilled water or deionized water can be used for this washing.

The polyarylene sulfide can be utilized in forming products as are generally known in the art. For instance, the polyarylene sulfide can be combined with additives such as one or more of fillers (e.g., glass fibers and/or particulate fillers), coupling agents, an impact modifier, antimicrobials, pigments, lubricants, antioxidants, stabilizers, surfactants, waxes, flow promoters, solid solvents, and other materials added to enhance properties and processability. Such optional materials may be employed in mixture in conventional amounts.

A mixture that is melt processed to form a melt processed thermoplastic composition may include the polyarylene sulfide (or a blend of multiple polyarylene sulfides, at least one of which is the polyarylene sulfide formed as described herein) in an amount from about 40 wt. % to about 90 wt. % by weight of the mixture, for instance from about 45% wt. % to about 80 wt. % by weight of the mixture.

The polyarylene sulfide may be melt processed according to techniques known in the art. For example, the polyarylene sulfide may be melt-kneaded in conjunction with one or more additives in a single-screw or multi-screw extruder at a temperature of from about 250° C. to about 320° C. In one embodiment, the polyarylene sulfide may be melt processed in an extruder that includes multiple temperature zones. For instance, the polyarylene sulfide may be melt processed in an extruder that includes a temperature zone that is maintained at a temperature of between about 250° C. and about 320° C.

Conventional shaping processes for forming articles including the polyarylene sulfide may be used. For instance, extrusion, injection molding, blow-molding, thermoforming, foaming, compression molding, hot-stamping, fiber spinning and so forth can be used.

Shaped articles that may be formed including the polyarylene sulfide may include structural and non-structural shaped parts, for instance for appliances, electrical materials, electronic products, fibrous webs, and automotive engineering thermoplastic assemblies. Exemplary automotive shaped plastic parts are suitable for under the hood applications, including fan shrouds, supporting members, wire and cable jacketing, covers, housings, battery pans, battery cases, ducting, electrical housings, fuse buss housings, blow-molded containers, nonwoven or woven geotextiles, baghouse filters, membranes, and pond liners, to name a few. Other useful articles besides moldings, extrusion and fibers include wall panels, overhead storage lockers, serving trays, seat backs, cabin partitions, window covers, and electronic packaging handling systems such as integrated circuit trays.

A composition including the polyarylene sulfide can be used in a variety of electrical and electronic applications such as, for example, connectors and over-molding (insert-molding) parts is encompassed.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Test Methods

Density:

Density was determined according to ISO Test No. 1183 (technically equivalent to ASTM D792). The specimen was weighed in air then weighed when immersed in distilled water at 23° C. using a sinker and wire to hold the specimen completely submerged as required.

Particle Size and Particle Size Distribution:

Particle size analysis was carried out via Laser Diffraction of Sample Particles. Before analysis, a water basin was cleaned out thoroughly before running new samples. The instrument was allowed to auto rinse for a couple of minutes. Standard Operating Method (SOM) needs to be set up pertaining to specific sample being run.

Example 1

A mixture including polyarylene sulfide (MW 33 kDa), 1.5 wt. % polyarylene sulfide oligomers (5-10 kDa), NaCl (1 mol/mol sulfur), NMP 4 mol/mol sulfur), and water (2.9 mol/mol sulfur) was heated to 265° C. and cooled to 180° C. at 1 C/m in while stirring at 400 rpm. The mixture was washed twice with acetone to product a first product (Run A).

The procedure was repeated but with the inclusion of NaOH in the solution such that the pH of the final slurry (when 1 part slurry is diluted with 5 parts DI water and pH measured) had a pH between 8 and 12 (Run B). In a final slurry (when 1 part slurry is diluted with 5 parts DI water and pH measured) (Run C), acetic acid was added such that the pH was between 3 and 6.

FIG. 3A, FIG. 3B, and FIG. 3C provide images of increasing magnification of the precipitated particles. The porosity of the particles when precipitated from an acidic mixture was found to be comparable to that when precipitated from a basic mixture. In both cases, the porosity was higher than for a solution that was close to neutral pH. Particle integrity and fines levels were also better when pH was lower or higher than neutral.

Example 2

A mixture of polyarylene sulfide (MW 33 kDa), 1.5 wt. % oligomers (5-10 kDa), NaCl (1 mol/mol sulfur), NMP (4 mol/mol sulfur), and water (2.2 to 2.9 mol/mole sulfur) was heated to 265° C. and cooled down to 180° C. (from 0.5 to 1.5 C/m in) with rpm (300 to 500). The reactor mixture was washed with twice with acetone. Basic pH (8-12 when 1 part slurry is diluted with 4 parts DI water and pH measured).

Results are provided in the table below.

| Run | Mixing speed (RPM) | $H_2O:S$ (mol:mol) | Cooling Rate (° C./min) | $d_{50}$ | $d_{95}$ | Density (g/ml) |
|---|---|---|---|---|---|---|
| commercial | — | — | — | 905 | 371 | 0.500 |
| 1 | 500 | 2.9 | 0.5 | 1751 | 508 | 0.664 |
| 2 | 500 | 2.9 | 1.5 | 2234 | 541 | 0.657 |
| 3 | 500 | 2.2 | 0.5 | 1060 | 250 | 0.562 |
| 4 | 500 | 2.2 | 1.5 | 1780 | 363 | 0.572 |
| 5 | 300 | 2.9 | 0.5 | 1097 | 180 | 0.646 |
| 6 | 300 | 2.9 | 1.5 | 2480 | 183 | 0.654 |
| 7 | 300 | 2.2 | 0.5 | 552 | 119 | 0.582 |
| 8 | 300 | 2.2 | 1.5 | 859 | 141 | 0.605 |
| 9 | 400 | 2.5 | 1.0 | 1286 | 181 | 0.635 |
| 10 | 400 | 2.5 | 1.0 | 1318 | 218 | 0.621 |

The particle size distribution was found to be affected by factors such as mixing speed, $H_2O:S$ ratio, and cooling rate.

Example 3

A mixture of polyarylene sulfide (MW 33 kDa), 1.5 wt. % oligomers (5-10 kDa), NaCl (1 mol/mol sulfur), NMP (4 mol/mol sulfur), and water (2.2 to 2.9 mol/mole sulfur) was heated to 265° C. The reactor mixture was washed with twice with acetone. Basic pH (8-12 when 1 part slurry is diluted with 4 parts DI water and pH measured).

A single step cooling process and three different three-step cooling processes were carried out. FIG. 4 presents images of representative particles. The particle of FIG. 4A, was formed according to the disclosed methods and was found to be hard and porous. The particle of FIG. 4B formed in a single-step cooling process and was porous and crumbly, and the particle of FIG. 4C is a commercially available product, which was found to be hard, but less porous. Additional results are provided in the table below.

|  | $T_{initial}$-$T_{final}$ | ΔT | Cooling rate (° C./min) | total cooling time (min.) | $D_{50}$ | $D_{95}$ |
|---|---|---|---|---|---|---|
| 1 step | 269-180 | 80 | 0.5 | 160 | 1060 | 250 |
| 3-step (A) | 260-245 | 15 | 2.0 | 85 | | |
| | 245-220 | 25 | 0.5 | | 1264 | 291 |
| | 220-180 | 55 | 2.0 | | | |
| 3-step (B) | 260-235 | 25 | 2.0 | 72.5 | | |
| | 240-220 | 20 | 0.5 | | 1104 | 225 |
| | 220-180 | 40 | 2.0 | | | |
| 3-step (C) | 260-245 | 25 | 2.0 | 72.5 | | |
| | 245-230 | 20 | 0.5 | | 935 | 234 |
| | 230-180 | 40 | 2.0 | | | |

While certain representative embodiments and details have been shown for the purpose of illustrating the subject invention, it will be apparent to those skilled in this art that various changes and modifications may be made therein without departing from the scope of the subject invention.

What is claimed is:

1. A method for forming a particle including a polyarylene sulfide comprising:
   polymerizing a first sulfur-containing monomer and a first dihaloaromatic monomer in an organic amide solvent to form a polyarylene sulfide prepolymer;
   polymerizing the polyarylene sulfide prepolymer with a second dihaloaromatic monomer and a second sulfur-containing monomer to form a polyarylene sulfide in a polymerization solution;
   cooling a precipitation solution comprising the polyarylene sulfide, water and an organic solvent at a first cooling rate to a first temperature in a first cooling step;
   following the first cooling step, cooling the precipitation solution at a second cooling rate to a second temperature in a second cooling step, wherein the second cooling rate is slower than the first cooling rate; and
   following the second cooling step, cooling the precipitation solution at a third cooling rate to a third temperature in a third cooling step, wherein the third cooling rate is faster than the second cooling rate; wherein
   the polyarylene sulfide particle precipitates out of the precipitation solution over at least a portion of one or more of the first cooling step, the second cooling step, and the third cooling step.

2. The method of claim 1, wherein the first cooling rate is about 1° C. per minute or greater.

3. The method of claim 1, wherein the first temperature is from about 235° C. to about 245° C.

4. The method of claim 1, wherein the second cooling rate is about 1° C. per minute or less.

5. The method of claim 1, wherein the second temperature is from about 220° C. to about 230° C.

6. The method of claim 1, wherein the third cooling rate is about 1° C. per minute or greater.

7. The method of claim 1, wherein the polyarylene sulfide prepolymer is formed in a first reactor and the polyarylene sulfide is formed in a second reactor.

8. The method of claim 7, wherein the first, second, and third cooling steps are carried out in a third reactor.

9. The method of claim 1, wherein prior to the first cooling step, the precipitation solution includes water in an amount of about 5 moles of water per mole of sulfur or less.

10. The method of claim 1, wherein prior to the first cooling step, the precipitation solution includes water in an amount of from about 3 wt. % to about 10 wt. % by weight of the solution.

11. The method of claim 1, further comprising adding water to or removing water from the polymerization solution to form the precipitation solution.

12. The method of claim 1, wherein the organic solvent is an organic amide solvent.

13. The method of claim 12, wherein the organic amide solvent is N-methyl-2-pyrrolidone.

14. The method of claim 1, wherein prior to the first cooling step, the precipitation solution comprises the organic solvent in an amount of from about 2 moles of organic solvent per monomer unit of the polyarylene sulfide to about 5 moles of solvent per monomer unit of the polyarylene sulfide.

15. The method of claim 1, wherein prior to the first cooling step, the precipitation solution comprises from about 15 wt. % of the polyarylene sulfide with regard to the weight of the organic solvent to about 30 wt. % of the polyarylene sulfide with regard to the weight of the organic solvent.

16. The method of claim 1, wherein the pH of the precipitation solution is from about 8 to about 12 or from about 2 to about 6.

17. The method of claim 1, further comprising adding an acid to the polymerization solution to form the precipitation solution.

18. The method of claim 17, wherein the acid comprises acetic acid.

19. The method of claim 17, further comprising heating the acid prior to addition to the polymerization solution.

20. The method of claim 17, wherein the amount of acid added can be about 20 mol % or less of the total moles of sulfur contained in the first sulfur containing monomer and the second sulfur containing monomer.

21. The method of claim 1, wherein the precipitation solution comprises about 10 wt. % or less of polyarylene sulfide oligomers having a number average molecular weight of about 20,000 Daltons or less.

22. The method of claim 1, wherein the precipitation solution comprises about 10 moles of a salt per total mole of sulfur or less.

23. The method of claim 22, wherein the salt comprises a mixture of different salts.

24. The method of claim 22, wherein the salt comprises sodium chloride.

25. The method according to claim 1, wherein the method further comprises reacting an organic amide solvent with an alkali metal sulfide in the presence of an alkali metal hydrogen sulfide to form a complex including an alkali metal organic amine and the first sulfur containing monomer.

26. The method of claim 25, wherein the second sulfur containing monomer is provided in the form of a complex with the alkali metal organic amine.

27. The method of claim 1, wherein the first sulfur-containing monomer and/or the second sulfur-containing monomer are independently sodium hydrogen sulfide or sodium sulfide.

28. The method of claim 1, wherein the first dihaloaromatic monomer and/or the second dihaloaromatic monomer includes a mixture of polyhaloaromatic monomers.

29. The method of claim 1, wherein the first dihaloaromatic monomer and/or the second dihaloaromatic monomer comprises dichlorobenzene.

30. The method of claim 1, wherein the polymerization that forms the polyarylene sulfide prepolymer also forms a salt, the method further comprising separating the salt from the prepolymer.

31. The method of claim 1, further comprising washing the polyarylene sulfide particle.

32. A polyarylene sulfide particle formed according to the method of claim 1, the polyarylene sulfide of the particle having a bulk density of from about 0.2 grams per cubic centimeter to about 1 gram per cubic centimeter as determined according to ISO Test No. 1183.

33. The polyarylene sulfide particle of claim 32, the polyarylene sulfide particle having a pore area of from about 35 square meters per gram to about 74 square meters per gram as determined according to DIN 66 133.

34. The polyarylene sulfide particle of claim 32, the particle being one of a plurality of particles formed according the method of claim 1, the plurality of particles having a pore size distribution $d_{10}$ of from about 10 micrometers to about 100 micrometers.

35. The polyarylene sulfide particle of claim 32, the particle being one of a plurality of particles formed according the method of claim 1, the plurality of particles having a pore size distribution $d_{50}$ of from about 800 micrometers to about 2000 micrometers.

36. The polyarylene sulfide particle of claim 32, the particle being one of a plurality of particles formed according the method of claim 1, the plurality of particles having a pore size distribution $d_{95}$ of from about 2000 micrometers to about 3000 micrometers.

37. A thermoplastic composition comprising the polyarylene sulfide of the particle of claim 32 and one or more additives.

38. A molded product comprising the thermoplastic composition of claim 37.

* * * * *